United States Patent
Byren et al.

(10) Patent No.: US 8,731,013 B2
(45) Date of Patent: May 20, 2014

(54) LINEAR ADAPTIVE OPTICS SYSTEM IN LOW POWER BEAM PATH AND METHOD

(75) Inventors: Robert W. Byren, Manhattan Beach, CA (US); William B. King, Rancho Palos Verdes, CA (US); David M. Filgas, Newbury Park, CA (US)

(73) Assignee: Raytheon Company, Waltham, MA (US)

( * ) Notice: Subject to any disclaimer, the term of this patent is extended or adjusted under 35 U.S.C. 154(b) by 1642 days.

(21) Appl. No.: 11/657,215

(22) Filed: Jan. 24, 2007

(65) Prior Publication Data
US 2010/0232007 A1   Sep. 16, 2010

(51) Int. Cl.
*H01S 3/10* (2006.01)

(52) U.S. Cl.
USPC ............................... 372/26; 372/9

(58) Field of Classification Search
USPC ............................... 372/9, 26, 31
See application file for complete search history.

(56) References Cited

U.S. PATENT DOCUMENTS

| | | | |
|---|---|---|---|
| 4,249,140 A | 2/1981 | Frieberg | |
| 5,090,795 A | 2/1992 | Omeara et al. | |
| 5,694,408 A | 12/1997 | Bott et al. | |
| 6,219,360 B1 * | 4/2001 | Komine | 372/9 |
| 6,404,784 B2 | 6/2002 | Komine | |
| 6,809,307 B2 | 10/2004 | Byren et al. | |
| 6,849,841 B2 | 2/2005 | Byren et al. | |
| 6,888,872 B2 | 5/2005 | Vetrovec | |
| 2003/0062468 A1 | 4/2003 | Byren et al. | |
| 2003/0198265 A1 * | 10/2003 | Vetrovec | 372/35 |
| 2005/0135815 A1 * | 6/2005 | Gerwe et al. | 398/188 |
| 2006/0022115 A1 | 2/2006 | Byren | |

* cited by examiner

Primary Examiner — Armando Rodriguez
(74) Attorney, Agent, or Firm — Renner, Otto, Boisselle & Sklar, LLP (57) ABSTRACT

A system and method for providing a wavefront corrected high-energy beam of electromagnetic energy. In the illustrative embodiment, the system includes a source of a first beam of electromagnetic energy; an amplifier for amplifying said beam to provide a second beam; a sensor for sensing aberration in said second beam and providing an error signal in response thereto; a processor for processing said error signal and providing a correction signal in response thereto; and a spatial light modulator responsive to said correction signal for adjusting said beam to facilitate a correction of said aberration thereof. In more specific embodiments, the source is a laser and the sensor is a laser wavefront sensor. A mirror is disposed between said modulator and said sensor for sampling said beam. The mirror has an optical thin-film dielectric coating on at least one optical surface thereof. The coating is effective to sample said beam and transmit a low power sample thereof to said means for sensing aberration. The processor is an adaptive optics processor. The spatial light modulator may be a micro electro-mechanical system deformable mirror or an optical phased array. In the illustrative embodiment, the source is a master oscillator and the amplifier is a power amplifier beamline. An outcoupler is disposed between the oscillator and the amplifier.

41 Claims, 4 Drawing Sheets

FIG. 1a
(Prior Art)

Lasing Medium, Laser Beam

FIG. 1b
(Prior Art)

Lasing Medium, Laser Beam

FIG. 1c
(Prior Art)

Lasing Medium, Laser Beam, Mirror Cooler

LINEAR ADAPTIVE OPTICS SYSTEM IN LOW POWER BEAM PATH AND METHOD

BACKGROUND OF THE INVENTION

1. Field of the Invention

The present invention relates to optics. More specifically, the present invention relates to systems and methods for directing and correcting high-power beams of electromagnetic energy.

2. Description of the Related Art

Directed energy weapons and specifically high-energy laser (HEL) weapons are being considered for variety of military applications with respect to a variety of platforms, e.g., spaceborne, airborne and land based systems to name a few. These weapons generally involve the use of the laser or other source of a high-power beam to track and destroy a target. To achieve mission objectives, directed energy weapons must be accurately steered and optimally focused. Steering involves line-of-sight control while focusing, with respect to HEL weapons, involves wavefront error correction. Currently, wavefront error correction is typically achieved using adaptive optics. The current state of the art in laser beam control adaptive optics requires placing one or more deformable mirrors within the highest power portion of the beam path. The conventional deformable mirror is typically a large element with a thin face sheet and a number of piezoelectric actuators. Actuators are located behind the face sheet and are electrically driven to push and pull on the surface thereof to effect the deformation required to correct wavefront errors in an outgoing beam. The size of the active region of the deformable mirror must accommodate the full size of the high power laser beam in the high power Coudé path prior to expansion via an output telescope.

In addition, one or more fast steering mirrors, may be used to correct for tilt and direct the line-of-sight. A coarse gimbal may be employed to correct for line-of-sight errors as well. A plurality of wavefront sensors are typically employed along with an aperture sharing element (ASE). The ASE allows a single shared aperture to be advantageously used for both the low power sensors and the high power output laser beam, ensuring that the path through the atmosphere taken by the high power beam is the same as that taken by the wavefront sensor and that the correction applied to the shared atmospheric path is optimal for the high-power beam.

Unfortunately, the use of delicate optical devices in the path of a high-power beam is problematic. This is due to the fact that the high-power beam will heat and distort the optical element unless the element is actively cooled or has a coating with a very low optical absorption coefficient. The most durable coatings require a high temperature application process. Deformable mirrors are typically coated after the face sheet is bonded to the actuators, which limits the maximum temperature to which the deformable mirror assembly may be exposed without degrading the bond. Therefore, coatings may need to be applied at lower than optimal temperature using a less robust coating process, thereby reducing durability and/or increasing manufacturing cost.

In addition, conventional adaptive optics systems using deformable mirrors are limited in performance. Conventional deformable mirrors systems are limited with respect to the speed at which the mirror drive signals are computed and the reaction speed of the deformable mirror mechanism to correct for aberrations. There is also a limitation with respect to the number actuators that can be used. The number of actuators that may be used determines the resolution or "order" of the mirror. The stroke of the conventional deformable mirror is limited. "Stroke" relates to the amount of mirror surface deflection that may be achieved before either the piezoelectric actuators exceed their dynamic range or the face sheet begins to fail. Further, a conventional continuous face sheet deformable mirror cannot correct for a pathology in the spatial phase pattern, such as a branch point or an abrupt phase discontinuity. A branch point is a "singularity" in a deeply scintillated phase pattern caused by atmospheric turbulence over a long propagation path in which the phase monotonically increases around a zero amplitude point like a corkscrew, thereby requiring an abrupt $2\pi$ phase correction within the spatial phase pattern. Abrupt phase discontinuities may be caused by the optical discontinuities between segments of a multi-segment primary mirror.

In U.S. Pat. No. 5,694,408, issued Dec. 2, 1997, (the teachings of which are incorporated herein by reference). Bott, Rice, and Zediker appear to disclose a scheme which allows the deformable element to be placed in the low intensity region between a master oscillator and an array of fiber power amplifiers. The approach is to pre-distort the phase of the oscillator beamlets after separation in a distribution network and before injection into the fiber amplifier array, such that the pre-distortion corrects both the piston error between the individual fibers and optical aberrations in the atmosphere. However, this scheme is practical only with a coherently-combined array of single-mode fiber amplifiers, as each fiber channel is correctable in piston only, not high order. Also, this scheme is not applicable to multi-mode laser media such as large core fiber amplifiers or bulk media lasers as contemplated for weapon class HEL devices and may not be scaleable to high power levels due to random, high frequency phase noise caused by pump-induced temperature fluctuations within the fibers.

In U.S. Pat. No. 5,096,795, issued Feb. 25, 1992 (the teachings of which are incorporated herein by reference). O'Meara and Valley appear to disclose several related schemes for using a liquid crystal light valve (LCLV) in a self-correcting adaptive optics system. This approach, however, places the LCLV in the high power beam path and is therefore limited by the damage susceptibility of the liquid crystal material.

Accordingly, a need existed in the art for a fast, large-stroke, high spatial bandwidth or high order system or method for effecting wavefront correction of a high-power beam. The need was addressed by the teachings of U.S. Pat. No. 6,809,307 entitled System and Method for Effecting High-Power Beam Control with Adaptive Optics in Low Power Beam Path, issued Oct. 26, 2004 to Byren et al., the teachings of which are incorporated herein by reference. This system uses a nonlinear phase conjugate mirror at the end of a two-pass amplifier beamline within the high-energy laser device. Phase distortions, caused by the atmosphere and aerodynamic boundary layer (aircraft applications) are sensed by a wavefront sensor and these phase distortions are imposed directly on the wavefront of a laser master oscillator. The pre-distorted master oscillator beam is then amplified in a first pass through the high power amplifier beamline, where it picks up additional phase distortions due to thermal lensing within the gain elements. This amplified, distorted signal is phase conjugated such that the wavefront is reversed on a second path through the distorting amplifier media. After the second pass, the beam is amplified to full output power, the distortions from the amplifiers are corrected, and the conjugate of the phase error due to the atmosphere and boundary layer is imprinted on the beam. Now, when the high power beam propagates through the atmospheric and boundary-layer distortions, these distortions are compensated and a high intensity beam is delivered to the target of interest.

The drawback of this approach is that a two-pass phase conjugate amplifier beamline is required and use of a nonlinear optical phase conjugate mirror may not be advantageous for all high-power laser architectures envisioned for HEL weapon applications.

Hence, a need exists in the art for a more simple and efficient HEL design. Specifically, a need exists in the art for an HEL design that is smaller in size and lighter in weight and does not require nonlinear optical phase conjugation.

SUMMARY OF THE INVENTION

The need in the art is addressed by the system and method of the present invention. In the illustrative embodiment, the system includes a source of a first beam of electromagnetic energy; an amplifier for amplifying the beam to provide a second beam, a sensor for sensing aberration in the second beam and providing an error signal in response thereto; a processor for processing the error signal and providing a correction signal in response thereto; and a spatial light modulator responsive to the correction signal for adjusting the beam to facilitate a correction of the aberration thereof.

In more specific embodiments, source is a laser and the sensor is a laser wavefront sensor. A mirror is disposed between the modulator and the sensor for sampling the beam. The mirror has an optical thin-film dielectric coating on at least one optical surface thereof. The coating is effective to sample the beam and transmit a low power sample thereof to the means for sensing aberration. The processor is an adaptive optics processor. The spatial light modulator may be a micro-electro-mechanical mirror or an optical phased array. In the illustrative embodiment, the source is a master oscillator and the amplifier is a power amplifier beamline. An outcoupler is disposed between the oscillator and the amplifier.

Alternative embodiments are disclosed to illustrate other methods for sensing wavefront aberrations induced by the amplifier beamline. That is, in addition to being sampled as disclosed in connection with the illustrative embodiment, amplifier induced aberrations may be sensed with a low power probe beam provided via a beamsplitter by the master oscillator or a low power auxiliary laser.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1A:
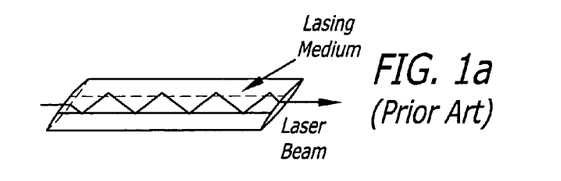
FIGS. 1a, 1b and 1c show common conventional geometries for high power bulk solid-state lasing media.
Figure 1B:
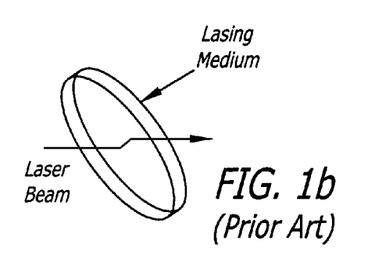
Figure 1C:
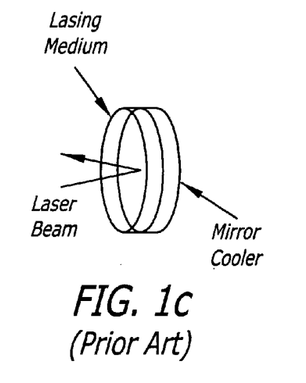

Traditional high power lasers rely on the geometry and thermal design of the laser medium and pumphead (cooling and support structure) to minimize the effects of thermally induced distortions on the beam quality of the laser. The most common geometries for high power bulk solid-state lasers are the parallelogram slab, disk, and active mirror, as shown pictorially in FIG. 1.

FIGS. 1a, 1b and 1c show common conventional geometries for high power bulk solid-state lasing media. The parallelogram slab, shown in FIG. 1a, advantageously uses a high aspect ratio active region to minimize the conduction path from the center of the active region to the cooled faces, thereby minimizing the temperature difference across the slab responsible for thermal lensing. Heat is constrained to flow predominantly in one direction parallel to the thin axis of the slab. Using a zig-zag propagation path through the slab as shown in the figure, each ray experiences essentially the same optical path length difference (OPD) as it traverses the slab length, and the thermal lens in the thin dimension (fast axis) is thereby compensated. Because the temperature is nearly uniform across the slow axis of the slab, thermal lensing in this direction is minimized. The temperature gradient also produces stress in the solid-state medium, which may further exacerbate the thermal lens, due to the opto-elastic effect, and cause thermal stress induced birefringence in the direction of the stress vector. For this reason, the laser beam polarization is normally oriented either parallel or perpendicular to the fast axis of the slab.

Structures and features known in the art, such as heater-bars and insulators, may be used within the pumphead design to further encourage one-directional heat flow within the slab active region. As the power extracted from the slab is increased, however, second order effects become much more important and a residual thermal lensing and birefringence result.

The disk laser geometry, shown in FIG. 1b, also uses the principle of one directional heat flow to minimize both thermal lensing and thermal stress induced birefringence. The disks are cooled on their broad faces and the direction of heat flow is from the center plane of the slab to the faces. As with the parallelogram, the OPD through the slab is nearly constant and the thermal lensing is minimized. The beam is normally polarized either perpendicular to or parallel to the direction of heat flow to minimize depolarization from the stress birefringence. A disadvantage of the disk geometry is that the high power laser beam must pass through the cooling fluid (e.g., nitrogen, helium, water, index matching liquid) where it can be absorbed and further distorted by thermal blooming. In some implementations, the pump beam must also pass through the coolant, adding to the absorption and attendant beam distortion.

The active mirror is essentially a disk laser with a cooled mirror bonded to one end. The advantage of the active mirror design is that one of the disk surfaces is directly accessible for cooling; therefore the high power beam does not have to pass through a coolant fluid. Both the disk and active mirror suffer from second-order effects as the beam power is increased.

Figure 2:
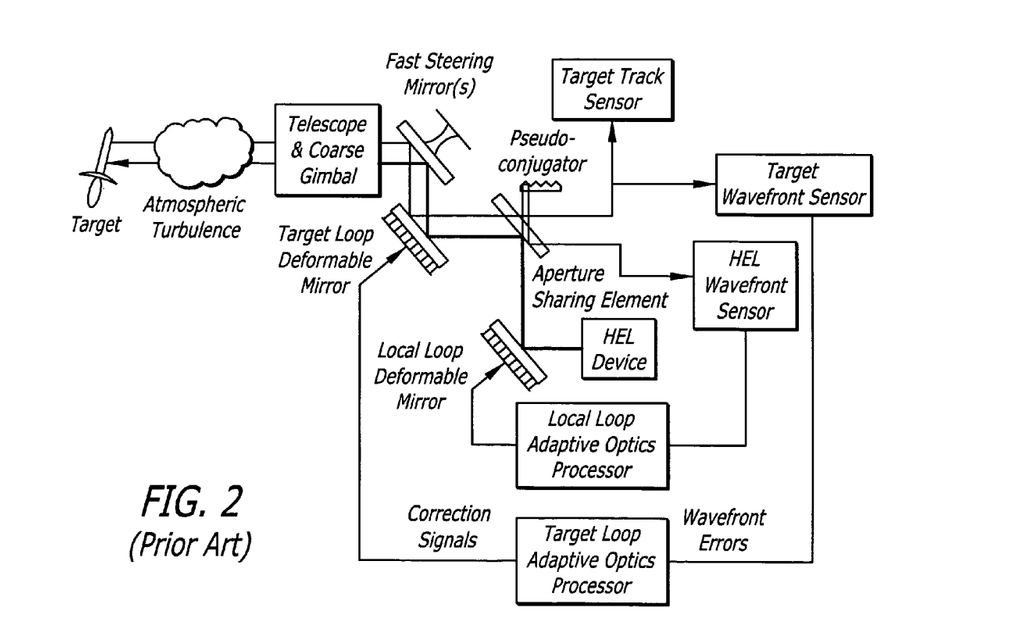
FIG. 2 is a diagram which shows an architecture for a conventional high energy laser beam control system.

FIG. 2 is a diagram which shows an architecture for a conventional high energy laser beam control system. A local-loop adaptive optics system is used to compensate the residual phase distortions present in the high power laser beam from the second-order effects described above. A target-loop adaptive optics system is used to compensate the phase distortions in the atmosphere from the HEL system to the target, including any aero-optic distortions produced in the aerodynamic boundary layer region surrounding the beam director turret. A properly-designed beam control system will also correct for distortions along the beam path within the beam control system, including non-common: path errors between the low-power wavefront sensing path and high power HEL beam path. In the traditional implementation shown in FIG. 2, non-common path errors between the target and local loop beam paths resulting primarily from distortions in the Aperture Sharing Element (ASE) are cancelled with the aid of a pseudo-conjugator (retro-reflector array) in the low power HEL wavefront sensor path.

The major drawback of the traditional adaptive optics beam control system, shown in FIG. 2 is the disposition of the wavefront control elements within the high power beam path for both the local loop and target loop. This limits the selection of wavefront control devices to large deformable mirrors with very low absorption optical coatings. In addition to the manufacturing challenges associated with depositing these laser-resistant coatings on the facesheets, the large DMs also suffer from limited stroke and slow response time compared with low power photonic elements such as micro electro-mechanical systems (MEMS) deformable mirrors and liquid crystal spatial light modulators (e.g., optical phased arrays). The large DMs are also expensive to manufacture and the cost grows significantly with the number of actuator elements, which determines the order of correction and figure error that can be achieved.

A number of conventional high power solid-state laser systems use adaptive optics either within a power oscillator or within the high power amplifier beamline of a master oscillator/power amplifier (MOPA) architecture to effect local-loop correction of the thermal distortions within the laser media, optics, and beam path.

Frieberg (U.S. Pat. No. 4,249,140) the teachings of which are incorporated herein by reference, discloses a HEL resonator feedback system in which the output of an unstable resonator containing an annular gain region with an annular deformable end mirror is sensed within an adaptive optics feedback loop which drives the deformable mirror, thereby controlling the phase of the output beam. In one embodiment, the sensor measures the far-field power-in-the-bucket (PITB) and the AO control loop maximizes the far-field PITB by providing "multi-correction signals" to the DM. Despite the problems with mapping the right phase correction to the actuators for a highly distorted solid-state medium, this approach uses a large DM within the high power beam path (albeit less than full output power due to extraction on the final pass through the gain medium). A target-loop implementation is also disclosed using the same general concept, and the performance of the target loop correction will be limited by the stroke and bandwidth limitations of the DM described above.

Komine (U.S. Pat. Nos. 6,219,360 B1 and 6,404,784 B2), the teachings of which are incorporated herein by reference, discloses a high power solid-state MOPA architecture in which a parallel arrangement of slab amplifiers are individually corrected with separate adaptive optics loops to produce a phased array of output beams. The wavefront correction elements, which include a tandem arrangement of multiple OPD Pre-compensation Slow Spatial Light Modulators (SLMs) and Holographic Phase Conjugation Fast SLMs associated with and located at the input of each independent parallel amplifier beamlines. The wavefront sensor is located at the output of the power amplifiers and a feedback controller is used to provide the correction signal to the SLMs based on the wavefront error. There is a controllability issue with this type of arrangement in that the phase errors at the output cannot be directly mapped onto the SLMs to drive the error to null in a straightforward manner, particularly when the wavefront errors are high order.

Vetrovec (U.S. Pat. No. 6,888,872 B2), the teachings of which are incorporated herein by reference, discloses a high power laser oscillator that uses multiple active minor gain elements with an adaptive optic system operating within and/or external to the unstable laser resonator cavity. As with Frieberg (and the actual implementation of Komine within the US Government Joint High Power Solid-State Laser system), the wavefront control elements are located in the high power portion of the laser beam path.

Byren et al. (U.S. Pat. No. 6,809,307 B2), the teachings of which are incorporated herein by reference, disclose an integrated phase conjugate master oscillator/power amplifier (PC MOPA) and beam control system in which the wavefront control elements are located in the low power beam path. The inventive architecture is shown in FIG. 3.

Figure 3:
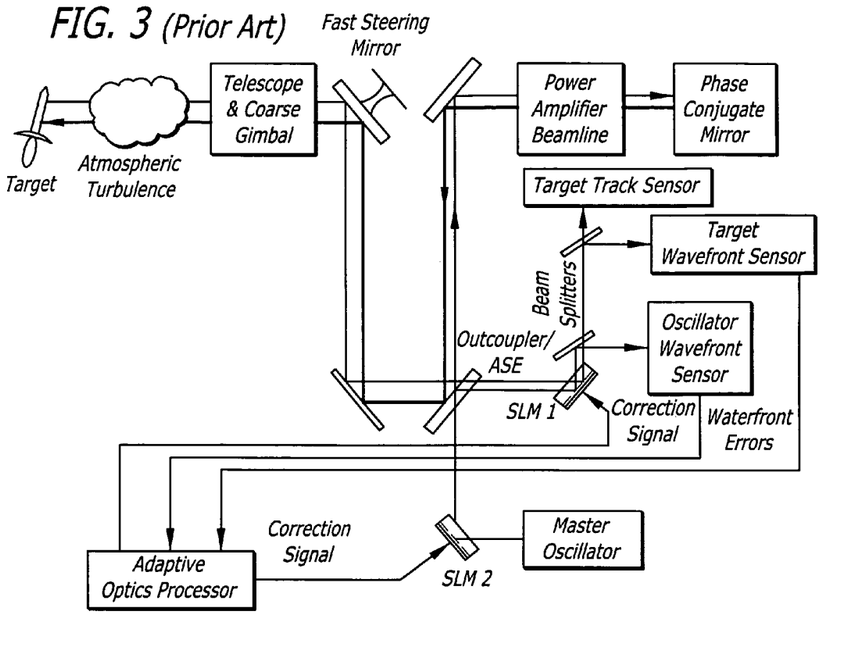
FIG. 3 is a diagram of a PC MOPA architecture in accordance with the teachings of Byren et al.

FIG. 3 is a diagram of a PC MOPA architecture in accordance with the teachings of Byren et al. The low signal-to-noise ratio target wavefront sensor is always operated on-null, ensuring good performance under all target reflectivity and range conditions. The control algorithm for SLM 1 is straightforward. It is driven, closed-loop, to flatten the phasefronts at the target wavefront sensor, thereby adjusting the phase of SLM 1 to be the conjugate of the combined phase error of the atmospheric disturbance and the distortions within the beam control beam path from the telescope aperture to the target wavefront sensor. The control algorithm for SLM 2 uses a crossover network, whereby the conjugate of the high frequency correction to SLM 1 is summed with the low frequency correction signal from the oscillator wavefront sensor. Because the signal from the master oscillator to the oscillator wavefront sensor samples all the non-common path distortions in the proper sense, these errors are fully corrected in the pre-distorted master oscillator beam. The conjugated beam from the amplifier beamline, therefore, has the proper phase to correct for distortions along the path to the target, and nothing else. This architecture allows the use of very fast, high spatial resolution, and long-stroke photonic devices, such as liquid crystal spatial light modulators (SLMs) or micro electro-mechanical systems (MEMS) deformable mirrors, in place of traditional high-power continuous-facesheet deformable mirrors, thereby accommodating the wide adaptive optics bandwidth (>1 kHz), high-order correction (>37 Zernike modes), and large OPD (~9 waves with tilt removed) requirements imposed by supersonic tactical aircraft. These devices along with their control systems are much less expensive that the large deformable mirrors required in a high power beam path.

The inventive architecture of Byren et al. is tailored strictly for use with a two-pass power amplifier beamline that uses a nonlinear optical phase conjugate mirror as a wavefront-reversing reflector between the passes. Given that other high energy laser weapon devices may not employ a two-pass power amplifier architecture or use a phase conjugate mirror, it is desirable to provide a local loop adaptive optics HEL correction approach that still uses photonic wavefront control elements in the low-power beam path, does not require nonlinear optical phase conjugation, and can be applied to both single-pass and two pass amplifier configurations. Furthermore, it is desirable to provide an integrated laser and beam control adaptive optics system in which all local and target loop elements are located in the low power beam path and which is not dependent on nonlinear optical phase conjugation to imprint the correct pre-distorted wavefront for atmospheric correction on the high-power beam.

Figure 4:
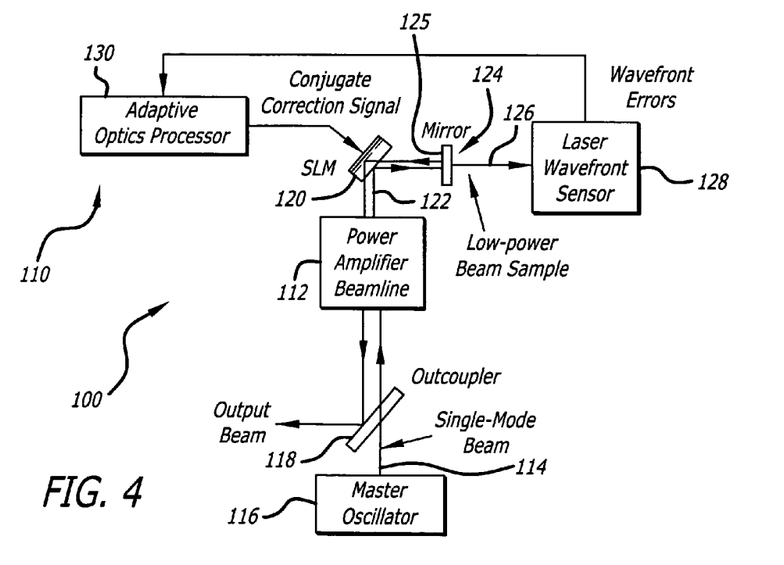
FIG. 4 shows an illustrative implementation of an adaptive optics system with a local-loop architecture for use with two-pass power amplifier beamline master-oscillator power amplifier in accordance with the present teachings.

FIG. 4 shows an illustrative implementation of an adaptive optics system with a local-loop architecture for use with a two-pass power amplifier beamline within a master oscillator power amplifier (MOPA) architecture in accordance with the present teachings. In this local-loop system 100, the functionality of a nonlinear optical phase conjugate mirror is replaced with a linear adaptive optics subsystem 110 in the low-power portion of a two-pass power amplifier beamline 112. This approach advantageously allows the use of photonic wavefront control elements to provide high-resolution, wide-bandwidth and long-stroke correction of the laser thermal lensing and accurately follows the high frequency changes in a pre-distorted master oscillator signal that carries the atmospheric and aerodynamic boundary layer aberrations in a high performance aircraft directed energy weapon system. This architecture can therefore replace the phase conjugate mirror element of Byren et al., shown in FIG. 3, above.

In FIG. 4, a single-mode beam 114 from a master oscillator 116 passes through an outcoupler 118 and makes a first pass through the distorting power amplifier beamline 112. The amplified beam 122 then reflects off a spatial light modulator (SLM) 120 and reflects off a flat, highly reflective mirror 124. The SLM 120 may be implemented with a micro-electro-mechanical system (MEMS) deformable mirror, an optical phased array or other suitable device capable of serving as an SLM. Likewise, the mirror 124 is subject to various implementations such as a dielectric coated optic, a semi-transparent metal surface, or a photonic (nano-structured) optical surface oriented essentially normal to the angle of incidence without departing from the scope of the present teachings. The reflective surface 125 of the mirror 124 allows some leakage of the amplified, distorted beam through the optic and this low-power beam sample 126 is sensed by a laser wavefront sensor 128. Other optical means for sampling the amplified beam 122 such as a diffraction grating or separate beamsplitter (not shown) may be used without departing from the scope of the present teachings. A linear adaptive optics processor 130 provides a conjugate correction signal which adjusts the spatial phase profile of the SLM such that the phasefront of the beam at the laser wavefront sensor is flat and the wavefront error is nulled. Alternative adaptive optic methods and algorithms known in the art may be used that are robust to branch points and other pathologies in the phase profile of the amplified beam, caused by severe phase distortions within the power amplifier beamline 122, without departing from the scope of the present teachings.

Several additional optical elements, not shown, may be used in this scheme to relay the pupil at the SLM 120 to the wavefront sensor to ensure that one is a conjugate plane of the other. The higher power portion of the beam that is reflected by the mirror now has a flat wavefront and after reflecting a second time off the SLM has the conjugate wavefront of the first-pass distorted beam. This conjugated beam then makes a second pass through the distorting power amplifier beamline and emerges with a corrected wavefront. Any distortions in the output beam arise from the initial beam quality of the master oscillator, imperfect conjugation of the first pass beam by the linear adaptive optics system, and non-common path errors in the outcoupler are thereby compensated.

Figure 5:
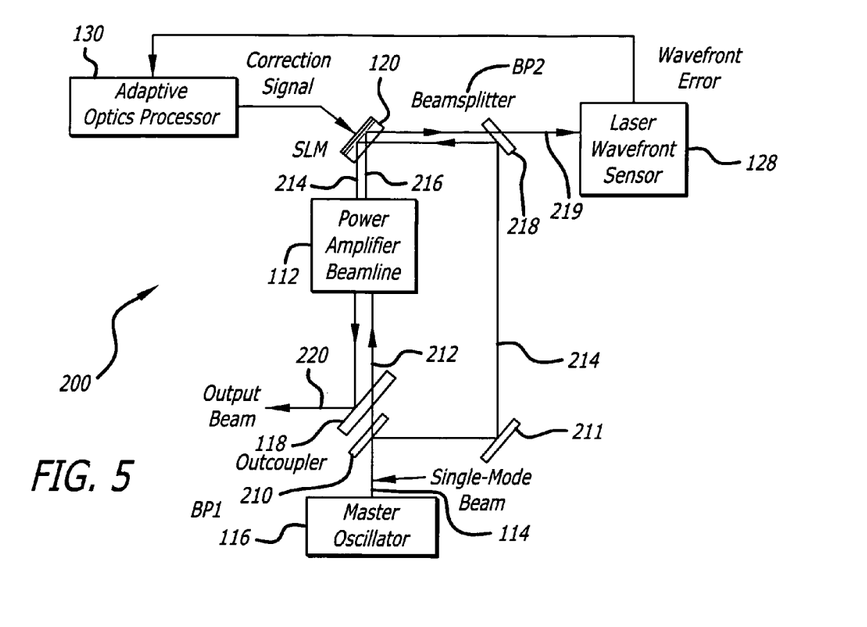
FIG. 5 shows an alternative implementation of an adaptive optics system with a local-loop architecture for use with two-pass power amplifier beamline master-oscillator power amplifier in accordance with the present teachings.

FIG. 5 shows an alternative implementation of an adaptive optics system with a local-loop architecture for use with a single-pass power amplifier beamline in a MOPA architecture in accordance with the present teachings. This scheme uses a low power sample 212 of the master oscillator beam 114 directly to sense the phase distortions within the power amplifier beamline. The low power sample 212 is provided by a first beamsplitter 210. Inasmuch as this reference beam 212 is within the gain line-width of the laser amplifier(s) 112, it is necessarily amplified in the process. The power in this reference beam is ideally tailored such that it does not extract much of the stored power within the amplifier beamline. The power amplifier beamline 112 applies distortion to the amplified reference beam 216. This distortion in the amplified reference beam is then sensed by the laser wavefront sensor 128 which sends an error signal to the adaptive optics processor 130. The adaptive optics processor applies a correction signal to the spatial light modulator 120 as discussed above.

The first beamsplitter 210 directs a second component 214 of the beam 114 from the master oscillator 116 to the power amplifier beamline 112 via one or more fold mirrors 211 and a second beamsplitter 218 and the spatial light modulator 120. The spatial light modulator applies the spatial wavefront correction to the second component 214 per the correction signal supplied by the adaptive optics processor. This beam amplified by the power amplifier beamline and reflected as the output beam 220 by the outcoupler 118.

Birefringent host media such as yttrium lithium fluoride (YLF) may be used in conjunction with polarization rotating elements such as quarter-wave plates or Faraday rotators such that the master oscillator beam in a first polarization state is outside the gain linewidth of the amplifier on the first pass but, upon polarization rotation between passes, lies within the gain linewidth allowing amplification and efficient energy extraction on the second pass. Orthogonal polarizations states also eliminate the possibility of nonlinear interactions occurring between beams 212 and 214 within the power amplifier beamline 112. This same functionality can also be accomplished by using an auxiliary laser as described below.

Figure 6:
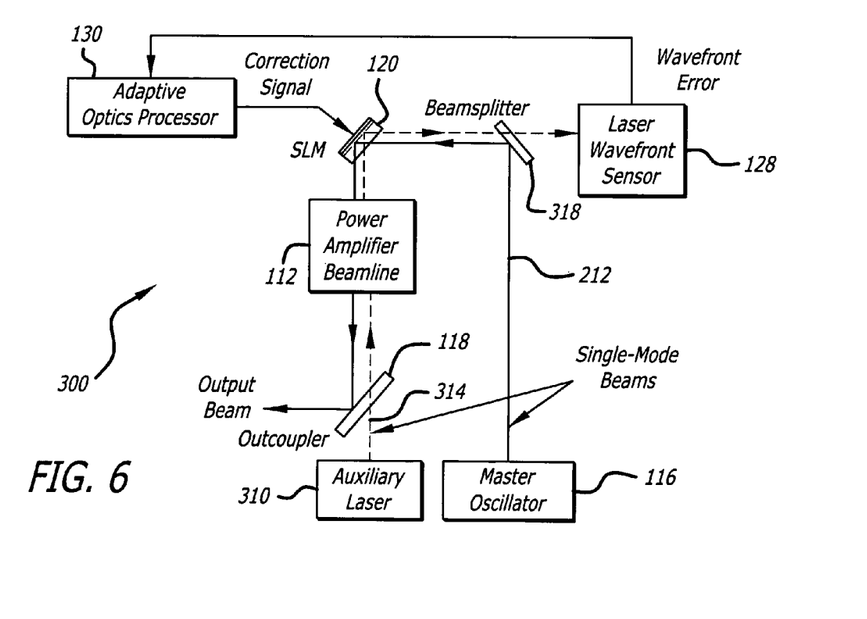
FIG. 6 shows the architecture of an alternate embodiment of the local-loop system used with a single-pass power amplifier beamline in which an auxiliary laser is used to provide the reference beam instead of the master oscillator in accordance with the present teachings.

FIG. 6 shows the architecture of an alternate embodiment of the local-loop system used with a single-pass power amplifier beamline in which an auxiliary laser 310 is used to provide the reference-beam instead of the master-oscillator 116. This scheme has the advantage that the auxiliary laser can be tuned the gain linewidth of the power amplifier medium, such that (1) no power is extracted from the beamline by the reference beam, (2) nonlinear interactions between the beams are suppressed, and (3) the power of the signal sensed by the laser wavefront sensor is constant, regardless of the operating state of the amplifier. The wavelength offset also allows use of wavelength selective beamsplitting approaches to be utilized to separate the high power output beam from the reference beam. The disadvantage is that a new low power laser must be added to the architecture potentially increasing cost and complexity.

Inasmuch as the beams from the auxiliary laser and master oscillator are at a different wavelength, dispersion within the power amplifier beamline and other refractive elements within the shared correction path may cause an uncorrectable wavefront error in the output beam. This can be minimized by selecting the auxiliary laser and master oscillator wavelengths to be close together and by using lasing media and optical materials in which the refractive index difference between the auxiliary laser and master oscillator wavelengths is small. For example, if ytterbium-doped yttrium aluminum garnet (Yb:YAG) is used in the master oscillator and power amplifier beamline operating at 1.030 µm, then neodymium-doped yttrium aluminum garnet (Nd:YAG) could be used for the auxiliary laser 310 at 1.064 µm to minimize the chromatic wavefront error. Alternatively, the auxiliary laser may use the same host medium but be operated off the gain peak to reduce the gain for the reference beam relative to the gain of the output beam. In this manner, the wavelength offset may be relatively small (less than 1 nm to 10 nm or so). This allows the power of the reference beam to be increased providing a higher signal to noise ratio at the wavefront sensor.

Figure 7:
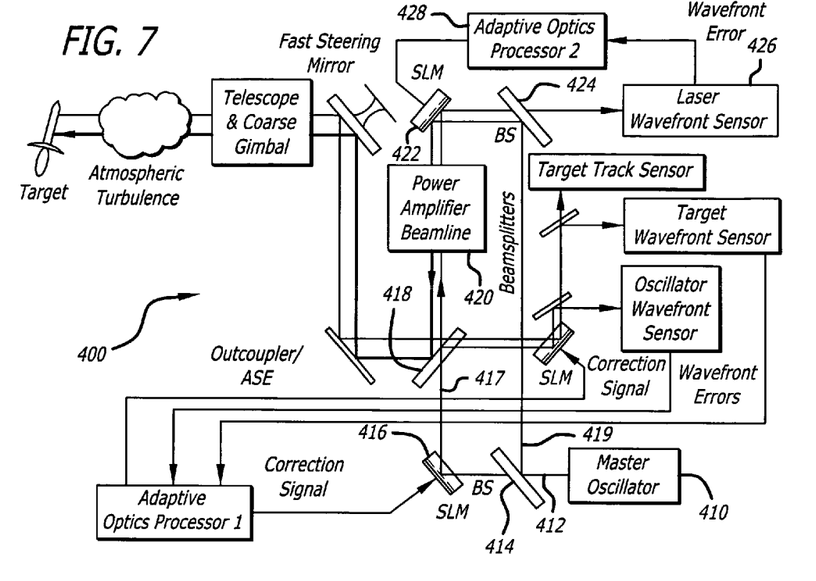
FIG. 7 shows the architecture of an integrated laser and beam control system, similar to the system of FIG. 3, in which all local and target loop elements are located in the low power beam path in accordance with the present teachings.

FIG. 7 shows the architecture of an integrated laser and beam control system 400, similar to the system of FIG. 3, in which the local and target loop elements are located in the low power beam path and which is not dependent on nonlinear optical phase conjugation to imprint the correct pre-distorted wavefront for atmospheric correction on the high-power beam in accordance with the present teachings. The functionality of the target loop and pre-distortion correction signal generation is identical to that of the system disclosed by Byren et al., as described above. The differences are: (1) the nonlinear phase conjugate mirror is replaced by a linear servo loop 430 comprising the laser wavefront sensor 426, adaptive optics processor 428, SLM 422, and the beamsplitter 424 and (2) the master oscillator 410 is used both to provide the reference beam 417, which is pre-distorted with the atmospheric compensation term via a second SLM 416, and the single-mode master oscillator beam 419 that is injected into the power amplifier beamline after reflecting off the first SLM 422. This arrangement ensures that the first SLM 422 will pre-distort the master oscillator beam with the correct wavefront to compensate for the thermal lensing distortions within the power amplifier beamline, atmospheric turbulence, aerodynamic boundary layer distortions, common path optic distortions, and non-common path errors from the outcoupler/ aperture sharing element 418 and other non-shared optics. This approach has the same advantages and disadvantages discussed under the inventive linear local loop adaptive optics scheme of FIG. 5.

Figure 8:
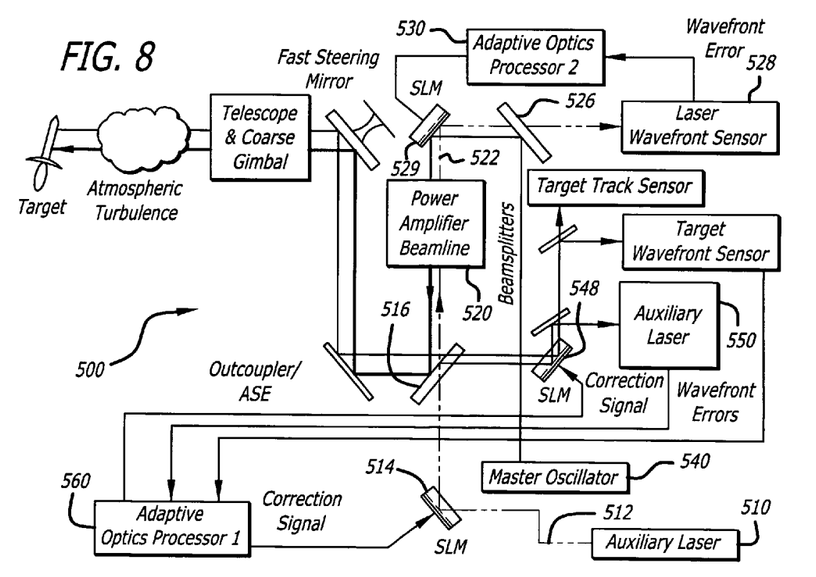
FIG. 8 shows the architecture of an alternate embodiment of an integrated laser and beam control system, similar to the system of FIG. 3, in which an auxiliary laser is used to provide the reference beam in accordance with the present teachings.

FIG. 8 shows the architecture of an alternate embodiment of the integrated laser and beam control system, similar to the system of FIG. 3, in which an auxiliary laser 510 is used to provide the reference beam, instead of the master oscillator 540. In this case, the oscillator wavefront sensor of FIG. 7 is replaced with an auxiliary laser wavefront sensor 550. As per the embodiment of FIG. 6, this scheme offers the advantage that the auxiliary laser can be tuned off the gain linewidth of the power amplifier medium, such that: (1) no power is extracted from the beamline by the reference beam, (2) nonlinear interactions between the beams are suppressed, and (3) the power of the signal sensed by the laser wavefront sensor is constant, regardless of the operating state of the amplifier. The disadvantage is that a new low power laser must be added to the architecture, potentially increasing cost and complexity.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system comprising:
    a source of a first low power beam of electromagnetic energy;
    means for sensing wavefront aberration in said low power beam and providing an error signal in response thereto;
    means for processing said error signal and providing a correction signal in response thereto;
    a spatial light modulator responsive to said correction signal for adjusting said low power beam to facilitate a correction of said aberration thereof and
    means for amplifying said low power beam to provide an output beam.

2. The invention of claim 1 wherein said means for sensing is a wavefront sensor.

3. The invention of claim 2 further including means disposed between said spatial light modulator and said sensor for sampling said beam.

4. The invention of claim 3 wherein said means for sampling said beam is a mirror.

5. The invention of claim 4 wherein said mirror has an optical thin-film dielectric coating on at least one optical surface thereof.

6. The invention of claim 5 wherein said coating is effective to sample said beam and transmit a low power sample thereof to said means for sensing aberration.

7. The invention of claim 1 wherein said means for processing is an adaptive optics processor.

8. The invention of claim 1 wherein said spatial light modulator is a micro electro-mechanical system deformable mirror.

9. The invention of claim 1 wherein said spatial light modulator is an optical phased array.

10. The invention of claim 1 wherein said source is a master oscillator.

11. The invention of claim 1 further including an outcoupler disposed between said source and said means for amplifying.

12. The invention of claim 1 wherein said means for amplifying is a power amplifier beamline.

13. The invention of claim 1 wherein the source is a laser.

14. A high-energy laser comprising:
    a master oscillator for providing a first laser beam;
    an amplifier disposed in optical alignment with said oscillator;
    a mirror with a thin-film dielectric coating adapted to sample a beam output by said amplifier and provide a low power sample thereof as a second laser beam and a reflected beam as a third beam;
    a wavefront sensor for sensing aberration in said second beam and providing an error signal in response thereto;
    an adaptive optics processor for processing said error signal and providing a correction signal in response thereto;

a spatial light modulator responsive to said correction signal for adjusting said third beam to facilitate a correction of said aberration thereof; and an outcoupler disposed in optical alignment with said spatial light modulator and adapted to output said third beam.

15. The invention of claim 14 wherein said spatial light modulator is a micro electro-mechanical system deformable mirror.

16. The invention of claim 15 wherein said spatial light modulator is an optical phased array.

17. A high-energy laser comprising:
a master oscillator for providing a first laser beam;
a first beamsplitter for splitting said first beam into second and third beams;
an amplifier disposed in optical alignment with said oscillator to receive said second beams;
a laser wavefront sensor for sensing aberration in said second beam and providing a first error signal in response thereto;
a first adaptive optics processor for processing said error signal and providing a first correction signal in response thereto;
a first spatial light modulator responsive to said first correction signal for adjusting said third beam to facilitate a correction of said aberration thereof; and
an outcoupler disposed in optical alignment with said modulator and adapted to output said third beam after amplification by said amplifier.

18. The invention of claim 17 further including a target wavefront sensor adapted to receive a return beam output by said outcoupler and provide a second error signal in response thereto.

19. The invention of claim 18 further including an oscillator wavefront sensor adapted to receive a portion of said second beam and provide a third error signal in response thereto.

20. The invention of claim 19 a second adaptive optics processor for receiving said second and third error signals and providing second and third correction signals in response thereto.

21. The invention of claim 20 further including a second spatial light modulator for coupling said second beam to said amplifier.

22. The invention of claim 21 wherein said second spatial light modulator is responsive to said second correction signal to adjust said second beam to facilitate a correction of aberration thereof.

23. The invention of claim 21 further including a third spatial light modulator for coupling said second beam and said return beam to said oscillator wavefront sensor and said target wavefront sensor respectively.

24. The invention of claim 23 wherein said third spatial light modulator is responsive to said third correction signal to adjust said second beam and said return beam to facilitate a correction of aberration thereof.

25. The invention of claim 18 further including a target track sensor adapted to receive said return beam.

26. A high-energy laser comprising:
a first laser for providing a first laser beam;
a second laser for providing a second laser beam;
an amplifier disposed in optical alignment with said oscillator to receive said first beam;
a first laser wavefront sensor for sensing aberration in said first beam and providing a first error signal in response thereto;
a first adaptive optics processor for processing said error signal and providing a first correction signal in response thereto;
a first spatial light modulator responsive to said correction signal for adjusting said second beam to facilitate a correction of aberration thereof; and
an outcoupler disposed in optical alignment with said spatial light modulator and adapted to output said second beam after amplification by said amplifier.

27. The invention of claim 26 wherein said second beam is directed to said amplifier by a dichroic mirror.

28. The invention of claim 26 wherein said first beam and said second beam are close in wavelength.

29. The invention of claim 26 further including a target wavefront sensor adapted to receive a return beam output by said outcoupler and provide a second error signal in response thereto.

30. The invention of claim 29 further including an oscillator wavefront sensor adapted to receive said first beam and provide a third error signal in response thereto.

31. The invention of claim 30 including a second adaptive optics processor for receiving said second and third error signals and providing second and third correction signals in response thereto.

32. The invention of claim 31 further including a second spatial light modulator for coupling said first beam to said amplifier.

33. The invention of claim 32 wherein said second spatial light modulator is responsive to said first correction signal to adjust said first beam to facilitate a correction of aberration thereof.

34. The invention of claim 32 further including a third spatial light modulator for coupling said first beam and said return beam to said oscillator wavefront sensor and said target wavefront sensor respectively.

35. The invention of claim 34 wherein said third spatial light modulator is responsive to said second correction signal to adjust said first beam and said return beam to facilitate a correction of aberration thereof.

36. The invention of claim 29 further including a target track sensor adapted to receive said return beam.

37. The invention of claim 13 further including a second laser.

38. The invention of claim 37 wherein said first laser is an auxiliary laser.

39. The invention of claim 38 wherein said second laser is a master oscillator.

40. The invention of claim 39 wherein second laser is amplified by said means for amplifying.

41. A system comprising:
a master oscillator;
an auxiliary laser adapted to provide a low power beam of electromagnetic energy;
a wavefront error sensor for sensing wavefront aberration in said low power beam and providing an error signal in response thereto;
an adaptive optics processor for processing said error signal and providing a correction signal in response thereto;
a spatial light modulator responsive to said correction signal for adjusting a beam output by said master oscillator to facilitate a correction of aberration therein and
means for amplifying said beam output by said master oscillator to provide a corrected output beam.

* * * * *